(12) United States Patent
Chung et al.

(10) Patent No.: US 6,421,330 B1
(45) Date of Patent: Jul. 16, 2002

(54) APPARATUS AND METHOD FOR EXPANDING SERVICE AREA OF CDMA MOBILE COMMUNICATION SYSTEM

(75) Inventors: Chae Hun Chung; Yang Soo Shin, both of Ichon (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 0 days.

(21) Appl. No.: 09/301,474

(22) Filed: Apr. 28, 1999

(30) Foreign Application Priority Data

Sep. 3, 1998 (KR) .............................. 98-36239

(51) Int. Cl.[7] .................................. H04B 1/38
(52) U.S. Cl. ..................... 370/335; 370/517; 370/519; 455/502; 455/503; 455/561
(58) Field of Search ................. 370/335, 350, 370/517, 519, 320, 342; 455/502, 503, 427, 561

(56) References Cited

U.S. PATENT DOCUMENTS

| | | | | |
|---|---|---|---|---|
| 5,280,629 A | * | 1/1994 | Lo Galbo et al. | 455/51.2 |
| 5,511,067 A | | 4/1996 | Miller | 370/335 |
| 5,841,767 A | * | 11/1998 | Nishi et al. | 370/329 |
| 5,930,722 A | * | 7/1999 | Han et al. | 455/502 |
| 5,953,384 A | * | 9/1999 | Walsh et al. | 375/354 |
| 6,011,786 A | * | 1/2000 | Dent | 370/330 |
| 6,011,977 A | * | 1/2000 | Brown et al. | 455/503 |
| 6,104,729 A | * | 8/2000 | Hellum et al. | 370/503 |
| 6,161,022 A | * | 12/2000 | Hwang et al. | 455/561 |
| 6,212,174 B1 | * | 4/2001 | Lomp et al. | 370/335 |
| 6,332,079 B1 | * | 12/2001 | Kim et al. | 455/446 |
| 6,332,086 B2 | * | 12/2001 | Avis | 455/574 |

* cited by examiner

Primary Examiner—Daniel Hunter
Assistant Examiner—Lana Le
(74) Attorney, Agent, or Firm—Merchant & Gould PC

(57) ABSTRACT

An apparatus and method for expanding a service area of a code division multiple access (CDMA) system restricted in terms of timing. The service area of a CDMA mobile communication system, which is defined by a radius longer than a radius of a communication supported area, namely, a cell, restricted in terms of timing due to the hardware of a base station modem ASIC equipped in the system, is radially divided into a plurality of radial zones by a constant distance not longer than a maximum possible cell radius allowed by the base station modem ASIC. In accordance with the present invention, signal processing units are used which are configured in such a fashion that one of them covers the entire zone of the service area in regard to forward links from an associated base station to mobile stations in different zones of the service area while covering only the zone nearest to the base station in regard to reverse links from the mobile stations to the base station. The remaining signal processing units cover reverse links associated with the remaining zones of the service area, respectively. By such a configuration, it is possible to extend the radius of the cell limited in terms of timing.

8 Claims, 7 Drawing Sheets

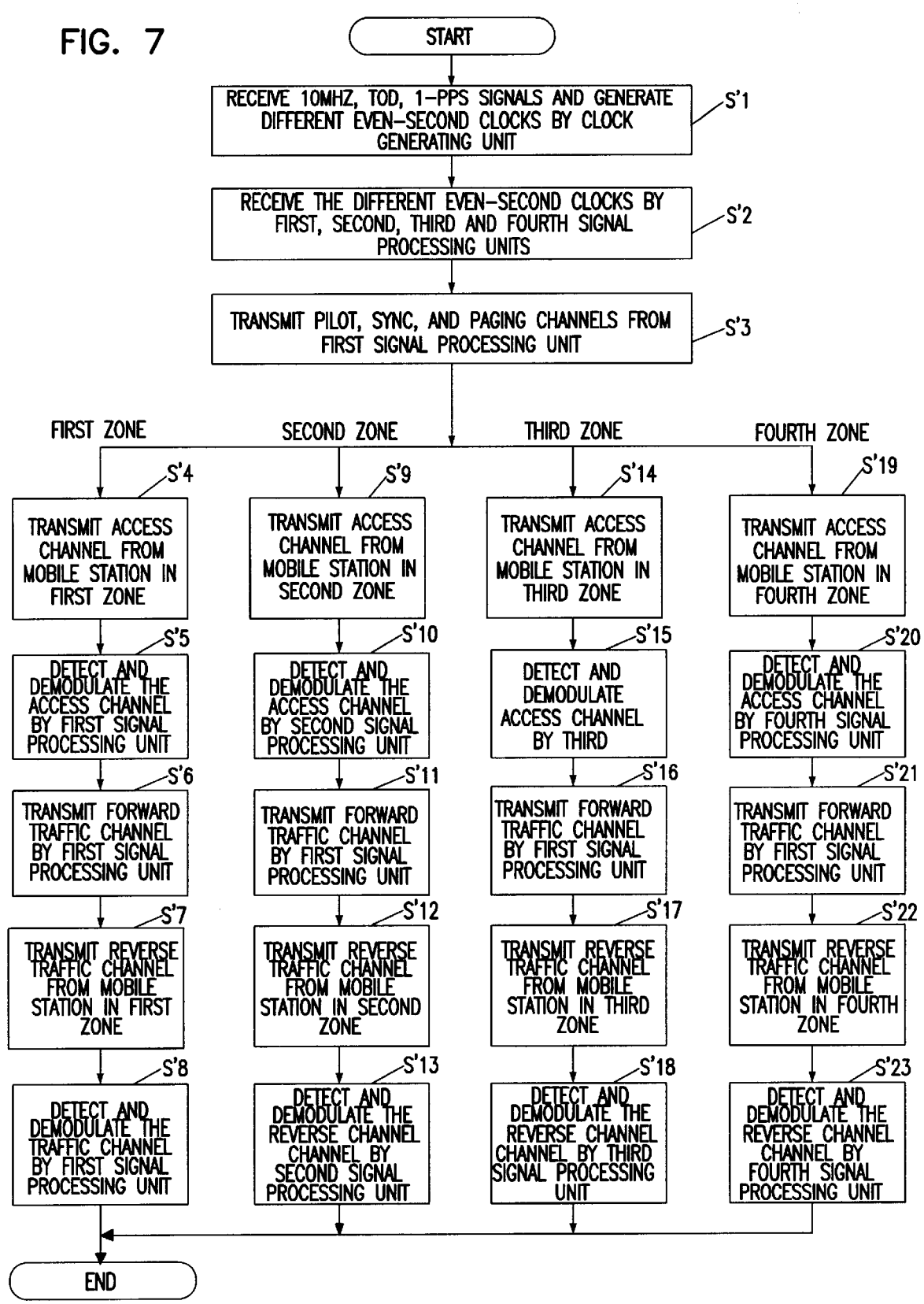

APPARATUS AND METHOD FOR EXPANDING SERVICE AREA OF CDMA MOBILE COMMUNICATION SYSTEM

BACKGROUND OF THE INVENTION

1. Field of the Invention

The present invention relates to an apparatus and method for expanding a service area of a code division multiple access (CDMA) system, and more particularly to an apparatus and method for expanding a service area of a CDMA system restricted in terms of timing.

2. Description of the Prior Art

In a CDMA mobile communication system, all mobile and base stations are temporally synchronized to a reference clock of the CDMA system. A mobile station acquires temporal information from a message transmitted from a base station. Based on the temporal information, the mobile station sets a reference time, thereby being synchronized to the base station. The reference time set by the mobile station is delayed, as compared to that set by the base station, because of a propagation delay of signals transmitted from the base station to the mobile station and a processing delay of signals in the mobile station. The mobile station transmits signals in sync with the reference time set by itself. Such a reverse link signal is received to the base station after being delayed by the propagation delay. Thus, the base station, which transmits signals in sync with a system reference clock, receives reverse link signals delayed for a certain period of time from the system reference clock. Hereinafter, such a time delay is referred to as a "bidirectional propagation delay".

In CDMA systems, the maximum allowable value of such a bidirectional propagation delay is hardwarily restricted by a modem application-specific integrated circuit (ASIC) equipped in a base station. The maximum allowable value of the bidirectional propagation delay is about 416 $\mu$s. This value corresponds to a cell radius of about 62 km (416 $\mu$s * the velocity of light/2) in an open area.

In the above mentioned conventional CDMA systems, however, the maximum allowable cell radius is restricted in terms of timing by a modem ASIC equipped in a base station. Due to such a restriction in cell radius, a large number of base stations should be installed on a wide area, including thinly populated areas, which is uneconomical.

U.S. Pat. No. 5,511,067 discloses a layered channel element in a base station modem for a CDMA cellular communication system associated with the above mentioned CDMA systems. A channel element is associated with each of five code channels including a pilot channel, a synchronization channel, a paging channel, a traffic channel, and an access channel. The channel element includes a control element and a modem. The pilot and synchronization channels are synchronized to system time by a CDMA system synchronization element, which can comprise, for example, a GPS receiver that provides a point from which the pilot and synchronization channel generation can be offset.

However, this technique has a problem in that the service area may be restricted in terms of timing because pilot and synchronization channels are generated in sync with a system time provided by a single synchronization element.

SUMMARY OF THE INVENTION

Therefore, the present invention has been made in view of the above mentioned problems, and an object of the invention is to provide an apparatus and method for expanding a service area of a CDMA system which are capable of expanding the service area restricted in terms of timing due to the hardware of a base station modem ASIC equipped in the system.

In accordance with one aspect, the present invention provides an apparatus for expanding a service area of a CDMA mobile communication system from a first zone resulting from a restriction of the service area occurring in terms of timing to second, third and fourth zones gradually expanding wider than the first zone by a distance not longer than a cell radius allowed by a base station modem application-specific integrated circuit (ASIC) equipped in the system, comprising: a clock generating unit for receiving 10 MHZ, time of day (TOD), and 1-pulse per second (PPS) signals from a global positioning system (GPS) receiver and generating a first even-second clock synchronized to the 1-PPS signal, the clock generating unit also generating second, third, and fourth even-second clocks delayed by respective maximum bidirectional propagation delay values associated with the second, third and fourth zones; a first signal processing unit for receiving the first even-second clock from the clock generating unit, the first signal processing unit serving to, in regard to forward links from an associated base station to mobile stations in the service area, modulate and transmit forward link channels covering all the first, second, third and fourth zones in sync with the first even-second clock while, in regard to reverse links from the mobile stations to the base station, detecting and demodulating only reverse link channels transmitted from mobile stations located in the first zone in sync with the first even-second clock; a second signal processing unit for receiving the second even-second clock from the clock generating unit, the second signal processing unit serving to detect and demodulate only reverse link channels transmitted to the base station from mobile stations located in the second zone in sync with the second even-second clock; a third signal processing unit for receiving the third even-second clock from the clock generating unit, the third signal processing unit serving to detect and demodulate only reverse link channels transmitted to the base station from mobile stations located in the third zone in sync with the third even-second clock; and a fourth signal processing unit for receiving the fourth even-second clock from the clock generating unit, the fourth signal processing unit serving to detect and demodulate only reverse link channels transmitted to the base station from mobile stations located in the fourth zone in sync with the fourth even-second clock.

In accordance with another aspect, the present invention provides a method for expanding a service area of a CDMA mobile communication system from a first zone resulting from a restriction of the service area occurring in terms of timing to second, third and fourth zones gradually expanding wider than the first zone by a distance not longer than a cell radius allowed by a base station modem application-specific integrated circuit (ASIC) equipped in the system, comprising the steps of: receiving, at a clock generating unit, 10 MHZ, TOD, and 1-PPS signals from the GPS receiver and generating, from the clock generating unit, a first even-second clock synchronized to the 1-PPS signal and second, third, and fourth even-second clocks delayed by respective maximum bidirectional propagation delay values associated with the second, third and fourth zones with respect to the first even-second clock; receiving, at first, second, third, and fourth signal processing units, the first, second, third, and fourth even-second clocks while modulating and transmitting pilot, synchronization, paging, and traffic channels covering all the first, second, third and fourth zones in sync with the first even-second clock by the first signal processing unit; detecting and demodulating an access channel transmitted from a mobile station located in the service area by one of the first, second, third, and fourth signal processing units associated with the zone where the mobile station is located, in sync with an associated one of the first, second, third, and fourth even-second clocks; modulating and transmitting a forward traffic channel associated with the zone of the mobile station in sync with the first even-second clock by the first signal processing unit; and detecting and demodulating a reverse traffic channel transmitted from the mobile station in sync with the associated even-second clock by the associated signal processing unit.

In accordance with another aspect, the present invention provides an apparatus for expanding a service area of a CDMA mobile communication system from a first zone resulting from a restriction of the service area occurring in terms of timing to second, third and fourth zones gradually expanding wider than the first zone by a distance not longer than a cell radius allowed by a base station modem application-specific integrated circuit (ASIC) equipped in the system, comprising: a clock generating unit for receiving 10 MHZ, time of day (TOD), and 1-pulse per second (PPS) signals from a global positioning system (GPS) receiver and generating a first even-second clock synchronized to the 1-PPS signal, the clock generating unit also generating second, third, and fourth even-second clocks delayed by respective maximum bidirectional propagation delay values associated with the second, third and fourth zones; a first signal processing unit for receiving the first even-second clock from the clock generating unit, the first signal processing unit serving to, in regard to forward links from an associated base station to mobile stations in the service area, modulate and transmit pilot, synchronization and paging channels covering all the first, second, third and fourth zones and a traffic channel covering the first zone in sync with the first even-second clock while, in regard to reverse links from the mobile stations to the base station, detecting and demodulating only reverse access and traffic channels transmitted from mobile stations located in the first zone in sync with the first even-second clock so as to cover only the first zone; a second signal processing unit for receiving the second even-second clock from the clock generating unit, the second signal processing unit serving to, in regard to forward links from the base station to the mobile stations in the second zone, modulate and transmit the forward traffic channel in a state advanced by a desired delay time corresponding to a delay time for which the second even-second clock is delayed from the first even-second clock while, in regard to reverse links from the mobile stations to the base station, detecting and demodulating only reverse access and traffic channels transmitted from the mobile stations in the second zone in sync with the second even-second clock so as to cover only the second zone; a third signal processing unit for receiving the third even-second clock from the clock generating unit, the third signal processing unit serving to, in regard to forward links from the base station to the mobile stations in the third zone, modulate and transmit the forward traffic channel in a state advanced by a desired delay time corresponding to a delay time for which the third even-second clock is delayed from the first even-second clock while, in regard to reverse links from the mobile stations to the base station, detecting and demodulating only reverse access and traffic channels transmitted from the mobile stations in the third zone in sync with the third even-second clock so as to cover only the third zone; and a fourth signal processing unit for receiving the fourth even-second clock from the clock generating unit, the fourth signal processing unit serving to, in regard to forward links from the base station to the mobile stations in the fourth zone, modulate and transmit the forward traffic channel in a state advanced by a desired delay time corresponding to a delay time for which the fourth even-second clock is delayed from the first even-second clock while, in regard to reverse links from the mobile stations to the base station, detecting and demodulating only reverse access and traffic channels transmitted from the mobile stations in the fourth zone in sync with the fourth even-second clock so as to cover only the fourth zone.

In accordance with another aspect, the present invention provides a method for expanding a service area of a CDMA mobile communication system from a first zone resulting from a restriction of the service area occurring in terms of timing to second, third and fourth zones gradually expanding wider than the first zone by a distance not longer than a cell radius allowed by a base station modem application-specific integrated circuit (ASIC) equipped in the system, comprising the steps of: receiving, at a clock generating unit, 10 MHZ, TOD, and 1-PPS signals from the GPS receiver and generating, from the clock generating unit, a first even-second clock synchronized to the 1-PPS signal and second, third, and fourth even-second clocks delayed by respective maximum bidirectional propagation delay values associated with the second, third and fourth zones with respect to the first even-second clock; receiving, at first, second, third, and fourth signal processing units, the first, second, third, and fourth even-second clocks while modulating and transmitting pilot, synchronization, paging, and traffic channels covering all the first, second, third and fourth zones in sync with the first even-second clock by the first signal processing unit; detecting and demodulating an access channel transmitted from a mobile station located in the service area by one of the first, second, third, and fourth signal processing units associated with the zone where the mobile station is located, in sync with an associated one of the first, second, third, and fourth even-second clocks; modulating and transmitting a forward traffic channel in sync with the first even-second clock by the first signal processing unit when the zone of the mobile station corresponds to the first zone while modulating and transmitting, by the associated signal processing unit, the forward traffic channel in a state advanced by a desired delay time corresponding to a delay time for which the associated even-second clock is delayed from the first even-second clock when the zone of the mobile station corresponds to one of the second, third, and fourth zones; and detecting and demodulating a reverse traffic channel transmitted from the mobile station in sync with the associated even-second clock by the associated signal processing unit.

BRIEF DESCRIPTION OF THE DRAWINGS

Other objects and aspects of the invention will become apparent from the following description of embodiments with reference to the accompanying drawings in which:

FIG. 7 is a flow chart illustrating a method for expanding a service area of a CDMA mobile communication system in accordance with the second embodiment of the present invention.

DESCRIPTION OF THE PREFERRED EMBODIMENTS

Figure 4:
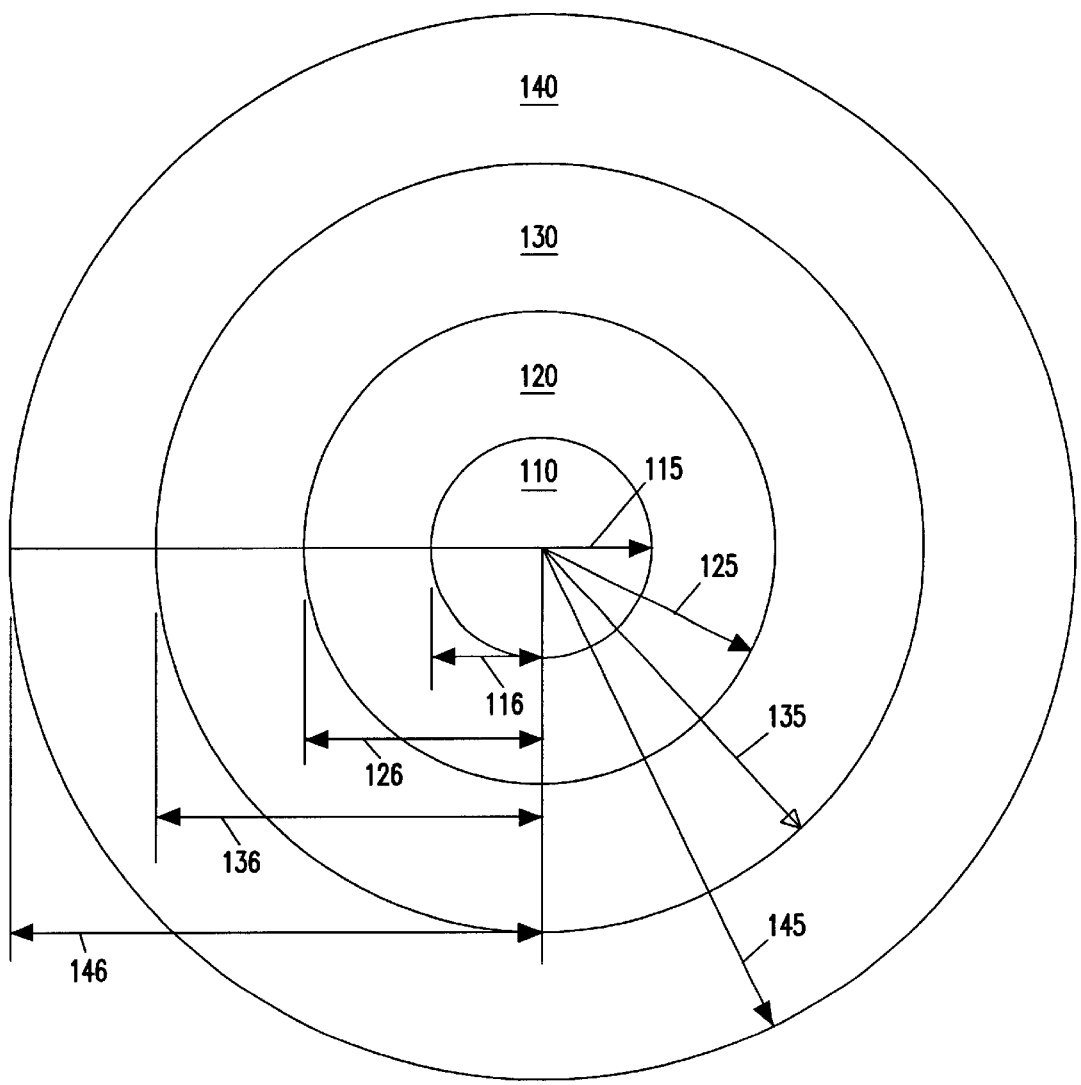
FIG. 4 is a diagram illustrating a service area of a CDMA mobile communication system to which the present invention is applied for an expansion of the service area.

FIG. 4 is a diagram illustrating a service area of a CDMA mobile communication system to which the present invention is applied for an expansion of the service area. Referring to FIG. 4, the entire service area of the CDMA mobile communication system, which is defined by a radius 145 longer than a radius 115 of a communication supported area, namely, a cell, restricted in terms of timing due to the hardware of a modem ASIC equipped in an associated base station, is radially divided into four radial zones, namely, a first zone 110, a second zone 120, a third zone 130 and a fourth zone 140 by a constant distance. The constant distance is shorter than a maximum possible radius of a cell restricted in terms of timing due to the hardware of a modem ASIC equipped in an associated base station. In this regard, the number of zones divided from the service area of the CDMA mobile communication system may vary depending on the cell radius.

Now, preferred embodiments of the present invention will be described in detail, in conjunction with FIG. 4.

Figure 1:
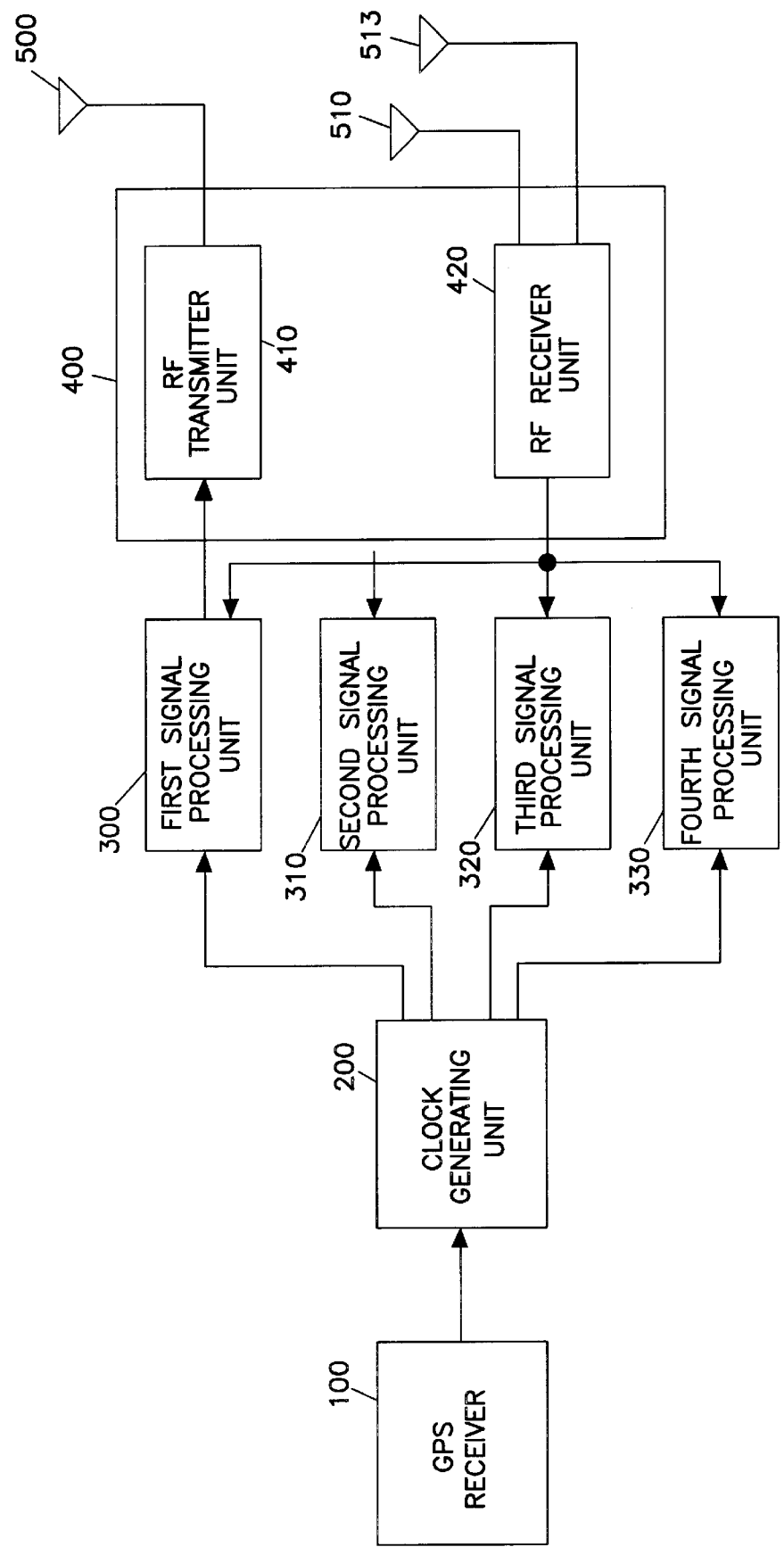
FIG. 1 is a block diagram illustrating an apparatus for expanding the service area of a CDMA mobile communication system in accordance with a first embodiment of the present invention.
Figure 2:
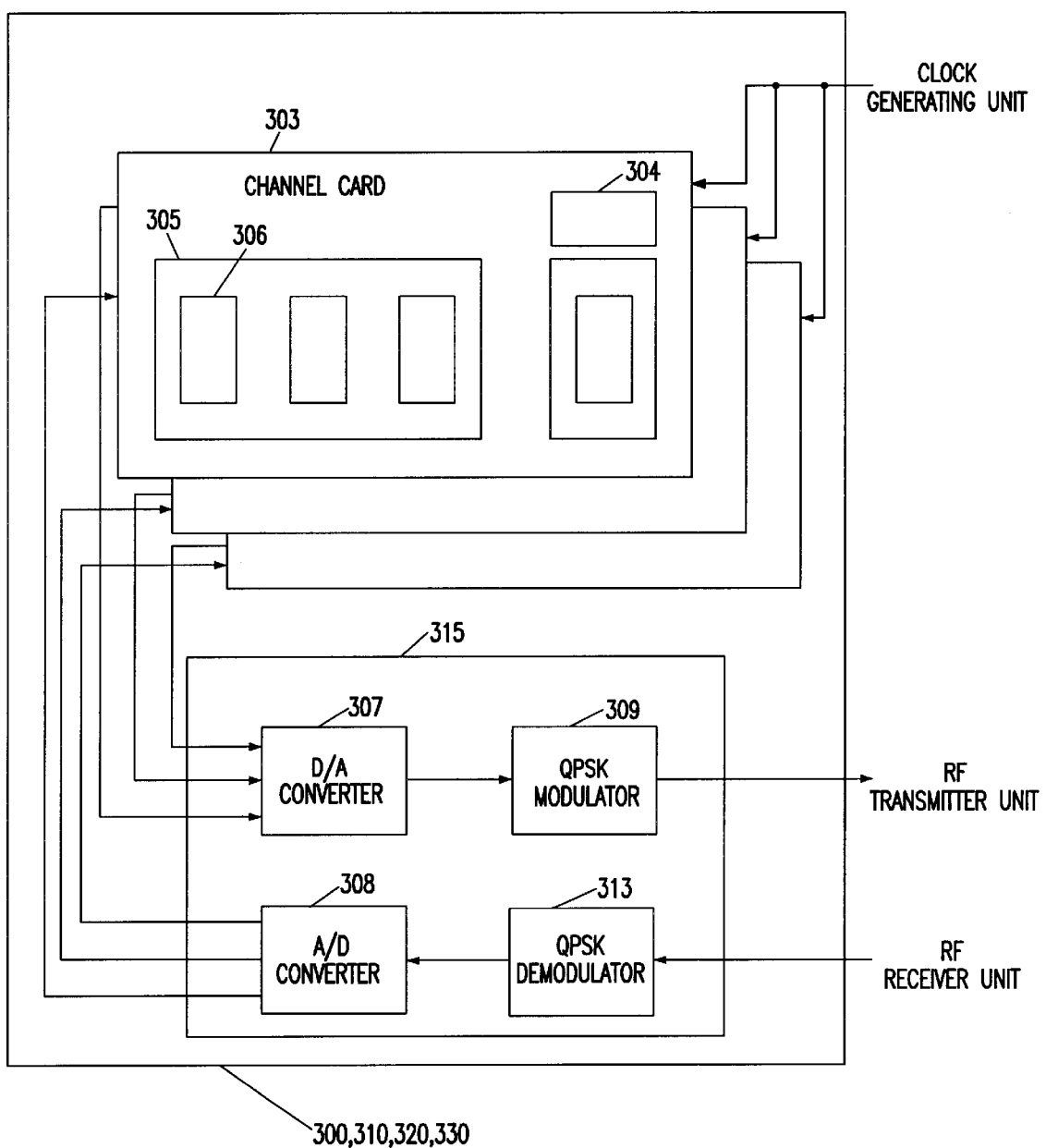
FIG. 2 is a block diagram illustrating a detailed configuration of a signal processing unit shown in FIG. 1.
Figure 3:
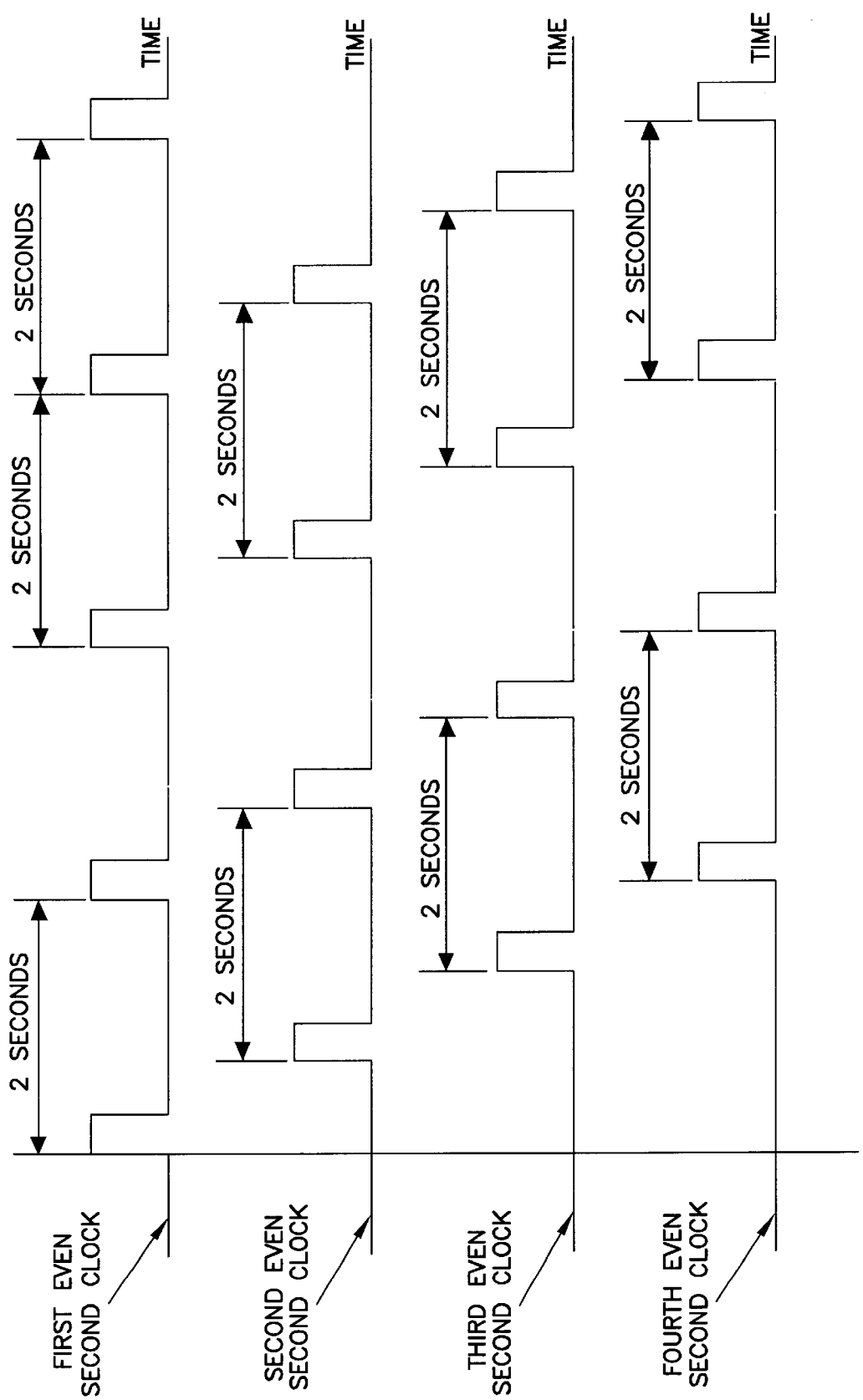
FIG. 3 is a timing diagram illustrating even-second clocks output from a clock generating unit shown in FIG. 1.

FIG. 1 is a block diagram illustrating an apparatus for expanding the service area of the CDMA mobile communication system in accordance with a first embodiment of the present invention. FIG. 2 is a block diagram illustrating a detailed configuration of a signal processing unit shown in FIG. 1. In addition, FIG. 3 is a timing diagram illustrating even-second clocks output from a clock generating unit shown in FIG. 1. As shown in FIG. 1, the service area expanding apparatus according to the first embodiment of the present invention includes a clock generating unit 200, four signal processing units, namely, a first signal processing unit 300, a second signal processing unit 310, a third signal processing unit 320, and a fourth signal processing unit 330, and a radio frequency (RF) signal processing means 400.

The clock generating unit 200 receives 10 MHZ, time of day (TOD), and 1-pulse per second (PPS) signals from a global positioning system (GPS) receiver 100 and generates a first even-second clock synchronized to the 1-PPS signal, as shown in FIG. 3. The clock generating unit 200 also generates second, third, and fourth even-second clocks delayed by respective maximum bidirectional propagation delay values associated with the second, third, and fourth zones 120, 130, and 140.

The first signal processing unit 300 receives the first even-second clock from the clock generating unit 200. In sync with the received first even-second clock, the first signal processing unit 300 modulates pilot, synchronization, paging, and traffic channels covering all the first, second, third and fourth zones 110, 120, 130 and 140 and sends the modulated channels to the RF signal processing means 400. When the first signal processing unit 300 receives access and traffic channels from mobile stations located in different zones, it serves to detect and demodulate only the access and traffic channels transmitted from the mobile station located in the first zone 110 in sync with the first even-second clock.

The second signal processing unit 310 receives the second even-second clock from the clock generating unit 200. When the second signal processing unit 310 receives access and traffic channels from mobile stations located in different zones, it serves to detect and demodulate only the access and traffic channels transmitted to the base station from the mobile station located in the second zone 120 in sync with the second even-second clock.

The third signal processing unit 320 receives the third even-second clock from the clock generating unit 200. When the third signal processing unit 320 receives access and traffic channels from mobile stations located in different zones, it serves to detect and demodulate only the access and traffic channels transmitted to the base station from the mobile station located in the third zone 130 in sync with the third even-second clock.

The fourth signal processing unit 330 receives the fourth even-second clock from the clock generating unit 200. When the fourth signal processing unit 330 receives access and traffic channels from mobile stations located in different zones, it serves to detect and demodulate only the access and traffic channels transmitted to the base station from the mobile station located in the fourth zone 140 in sync with the fourth even-second clock.

Each of the first, second, third and fourth signal processing units 300, 310, 320, 330 includes at least one channel card 303 and an analog modulator/demodulator unit 315. The channel card 303 includes at least one channel element 305 provided with a set of base station modem ASICs 306 (products manufactured by Qualcomm Company) and adapted to modulate/demodulate digital signals, and a channel card processor 304 adapted to control the channel element 305. The channel card receives an associated one of even-second clocks generated from the clock generating unit 200. The analog modulator/demodulator unit 315 includes a D/A converter 307 for receiving a digital signal from an associated channel card 303 and converting the received digital signal into an analog signal, a QPSK modulator 309 for receiving the analog signal from the D/A converter 307 and QPSK modulating the received analog signal, a QPSK demodulator 313 for receiving an input RF signal and QPSK demodulating the input RF signal, and an A/D converter 308 for receiving the QPSK demodulated signal from the QPSK demodulator 313 and converting the received signal into a digital signal.

The RF signal processing means 400 includes an RF transmitter unit 410 for receiving a forward link channel signal from the first signal processing unit 300 to be transmitted to a mobile station and RF modulating the received forward link channel signal in the form of a signal capable of being transmitted over a transmitting antenna 500, and an RF receiver unit 420 for receiving a reverse link channel signal from a mobile station over a receiving antenna 510 or 513 and RF modulating the received reverse link channel signal in the form of a signal capable of being processed in the first, second, third, and fourth signal processing units 300, 310, 320, and 330.

A service area expanding method, which is carried out using the apparatus having the above mentioned configuration according to the first embodiment of the present invention, will now be described.

Figure 5:
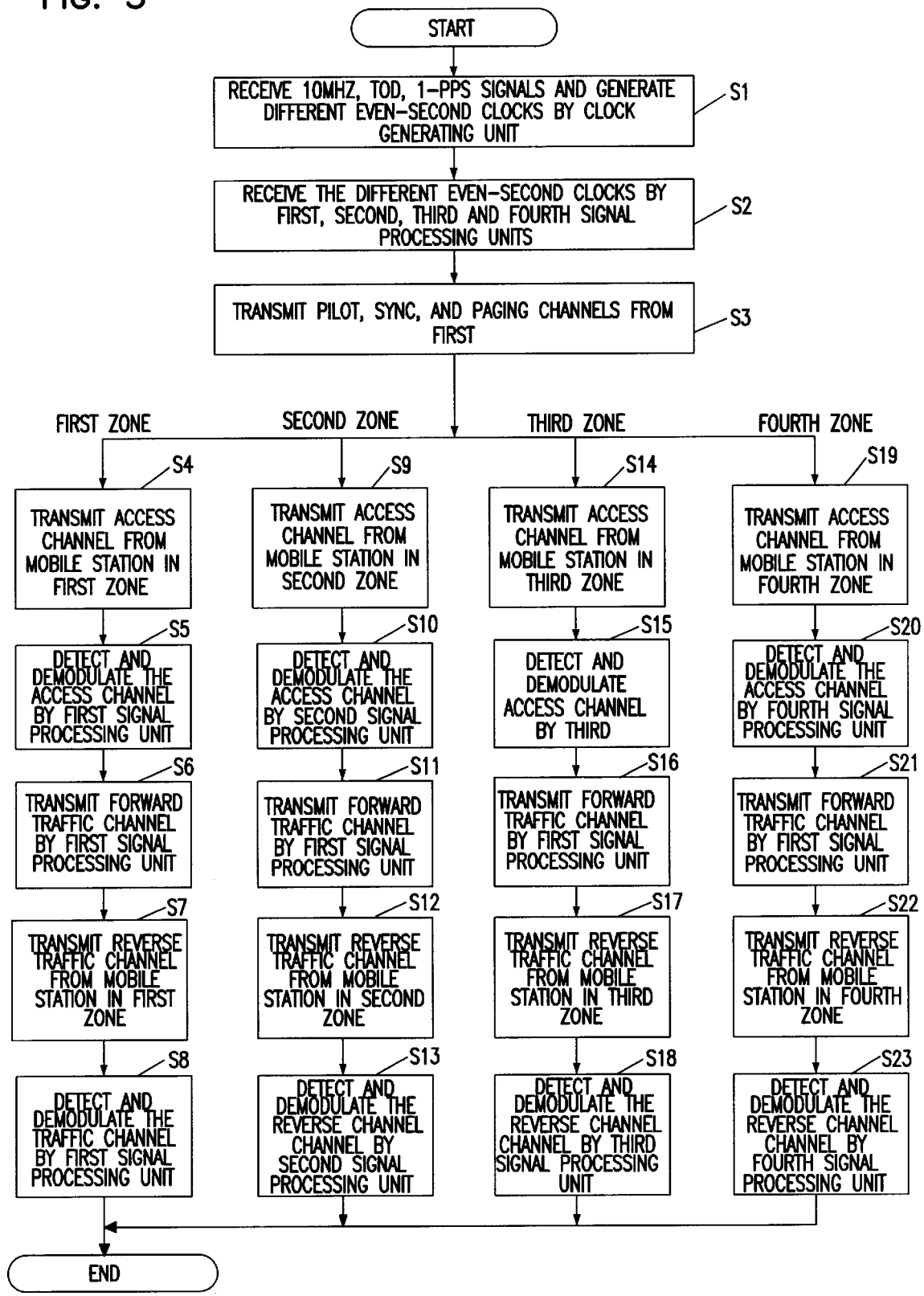
FIG. 5 is a flow chart illustrating a method for expanding a service area of a CDMA mobile communication system in accordance with the first embodiment of the present invention.

FIG. 5 is a flow chart illustrating a method for expanding a service area of a CDMA mobile communication system in accordance with the first embodiment of the present invention. In FIG. 5, "S" represents processing steps.

In accordance with the method, the clock generating unit 200 first receives 10 MHZ, TOD, and 1-PPS signals from the GPS receiver 100 and generates a first even-second clock synchronized to the 1-PPS signal. The clock generating unit 200 also generates second, third, and fourth even-second clocks delayed by respective maximum bidirectional propagation delay values associated with the second, third, and fourth zones 120, 130, and 140 with respect to the first even-second clock (S1).

The first, second, third, and fourth even-second clocks generated from the clock generating unit 200 are then applied to the first, second, third, and fourth signal processing units 300, 310, 320, and 330, respectively (S2). In sync with the received first even-second clock, the first signal processing unit 300 then modulates pilot, synchronization, paging, and traffic channels covering all the first, second, third and fourth zones 110, 120, 130 and 140 and transmits the modulated channels over all zones in the service area via the RF signal processing means 400 and transmitting antenna 500 (S3).

Where a mobile station in the first zone 110 transmits an access channel in response to the transmitted channels, all the first, second, third, and fourth signal processing units 300, 310, 320, and 330 receive the access channel via the receiving antenna 510 or 513 and RF signal processing unit 400 (S4). At this time, only the first signal processing unit 300 detects and demodulates the access channel in sync with the first even-second clock (S5).

The first processing unit 300 then modulates the traffic channel in sync with the first even-second clock and then transmits over the service area via the RF signal processing means 400 and transmitting antenna 500 (S6). The forward traffic channel is received to the mobile station in the first zone 110. In response to the forward traffic channel, the mobile station then transmits a reverse traffic channel to the base station (S7).

The reverse traffic channel from the mobile station is received to all signal processing units via the receiving antenna 510 or 513 and RF signal processing means 400. In sync with the first even-second clock, only the first signal processing unit 300 detects and demodulates the reverse traffic channel (S8). The entire procedure is then completed.

On the other hand, where a mobile station in the second zone 120 transmits, following step S3, an access channel (S9), all the first, second, third, and fourth signal processing units 300, 310, 320, and 330 receive the access channel via the receiving antenna 510 or 513 and RF signal processing unit 400. At this time, only the second signal processing unit 310 detects and demodulates the access channel in sync with the second even-second clock (S10).

The channel card processor in the second processing unit 310 then allocates a selected one of channel elements in the first signal processing unit 300, thereby enabling the first signal processing unit 300 to modulate the forward traffic channel in sync with the first even-second clock. The modulated forward traffic channel is then externally transmitted via the RF signal processing means 400 and transmitting antenna 500 (S11). The forward traffic channel is received to the mobile station in the second zone 120. In response to the forward traffic channel, the mobile station then transmits a reverse traffic channel to the base station (S12).

The reverse traffic channel from the mobile station is received to all signal processing units via the receiving antenna 510 or 513 and RF signal processing means 400. In sync with the second even-second clock, only the second signal processing unit 310 detects and demodulates the reverse traffic channel (S13). The entire procedure is then completed.

Where a mobile station in the third zone 130 transmits, following step S3, an access channel (S14), all the first, third, third, and fourth signal processing units 300, 310, 320, and 330 receive the access channel via the receiving antenna 510 or 513 and RF signal processing unit 400. At this time, only the third signal processing unit 320 detects and demodulates the access channel in sync with the third even-second clock (S15).

The channel card processor in the third processing unit 320 then allocates a selected one of channel elements in the first signal processing unit 300, thereby enabling the first signal processing unit 300 to modulate the forward traffic channel in sync with the first even-second clock. The modulated forward traffic channel is then externally transmitted via the RF signal processing means 400 and transmitting antenna 500 (S16). The forward traffic channel is received to the mobile station in the third zone 130. In response to the forward traffic channel, the mobile station then transmits a reverse traffic channel to the base station (S17).

The reverse traffic channel from the mobile station is received to all signal processing units via the receiving antenna 510 or 513 and RF signal processing means 400. In sync with the third even-second clock, only the third signal processing unit 320 detects and demodulates the reverse traffic channel (S18). The entire procedure is then completed.

On the other hand, where a mobile station in the fourth zone 140 transmits, following step S3, an access channel (S19), all the first, fourth, fourth, and fourth signal processing units 300, 310, 320, and 330 receive the access channel via the receiving antenna 510 or 513 and RF signal processing unit 400. At this time, only the fourth signal processing unit 320 detects and demodulates the access channel in sync with the fourth even-second clock (S20).

The channel card processor in the fourth processing unit 330 then allocates a selected one of channel elements in the first signal processing unit 300, thereby enabling the first signal processing unit 300 to modulate the forward traffic channel in sync with the first even-second clock. The modulated forward traffic channel is then externally transmitted via the RF signal processing means 400 and transmitting antenna 500 (S21). The forward traffic channel is received to the mobile station in the fourth zone 140. In response to the forward traffic channel, the mobile station then transmits a reverse traffic channel to the base station (S22).

The reverse traffic channel from the mobile station is received to all signal processing units via the receiving antenna 510 or 513 and RF signal processing means 400. In sync with the fourth even-second clock, only the fourth signal processing unit 330 detects and demodulates the reverse traffic channel (S23). The entire procedure is then completed.

Figure 6:
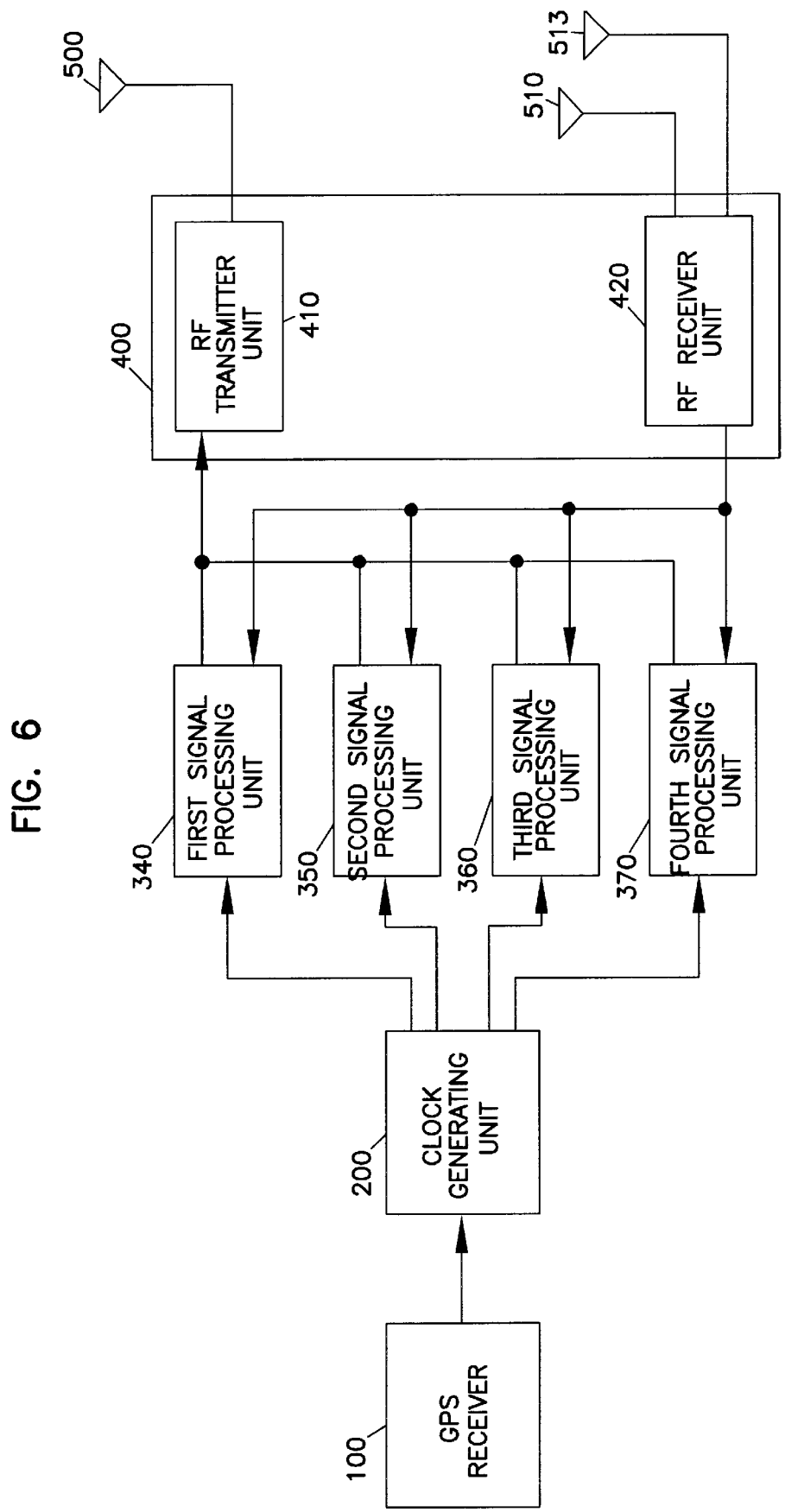
FIG. 6 is a block diagram illustrating an apparatus for expanding the service area of a CDMA mobile communication system in accordance with a second embodiment of the present invention.

FIG. 6 is a block diagram illustrating an apparatus for expanding the service area of a CDMA mobile communication system in accordance with a second embodiment of the present invention. In FIG. 6, the same constituting element as that of the first embodiment is denoted by the same reference numeral.

As shown in FIG. 6, the service area expanding apparatus according to the second embodiment of the present invention includes a clock generating unit 200, four signal processing units, namely, a first signal processing unit 340, a second signal processing unit 350, a third signal processing unit 360, and a fourth signal processing unit 370, and an RF signal processing means 400.

The clock generating unit 200 receives 10 MHZ, time of day (TOD), and 1-pulse per second (PPS) signals from a GPS receiver 100 and generates a first even-second clock synchronized to the 1-PPS signal, as shown in FIG. 3. The clock generating unit 200 also generates second, third, and fourth even-second clocks delayed by respective maximum bidirectional propagation delay values associated with the second, third, and fourth zones 120, 130, and 140.

The first signal processing unit 340 receives the first even-second clock from the clock generating unit 200. In regard to forward links from the base station to mobile stations, the first signal processing unit 340 modulates pilot, synchronization, and paging channels covering all the first, second, third and fourth zones 110, 120, 130 and 140 and a traffic channel covering only the first zone 110, in sync with the first even-second clock, and sends the modulated channels to the RF signal processing means 400. In regard to reverse links from mobile stations to the base station, the first signal processing unit 340 detects and demodulates access and traffic channels transmitted from mobile stations located in only the first zone 110 in sync with the first even-second clock so that reverse links covering only the first zone 110 are established.

The second signal processing unit 350 receives the second even-second clock from the clock generating unit 200. In regard to forward links from the base station to mobile stations, the second signal processing unit 350 advances the second even-second clock by a time for which the second even-second clock is delayed from the first even-second clock, and then demodulates and transmits the forward traffic channel in sync with the advanced clock. In regard to reverse links from mobile stations to the base station, the second signal processing unit 350 detects and demodulates access and traffic channels transmitted from mobile stations located in only the second zone 120 in sync with the second even-second clock so that reverse links covering only the second zone 120 are established.

The third signal processing unit 360 receives the third even-second clock from the clock generating unit 200. In regard to forward links from the base station to mobile stations, the third signal processing unit 360 advances the third even-second clock by a time for which the third even-second clock is delayed from the first even-second clock, and then demodulates and transmits the forward traffic channel in sync with the advanced clock. In regard to reverse links from mobile stations to the base station, the third signal processing unit 360 detects and demodulates access and traffic channels transmitted from mobile stations located in only the third zone 130 in sync with the third even-second clock so that reverse links covering only the third zone 130 are established.

The fourth signal processing unit 370 receives the fourth even-second clock from the clock generating unit 200. In regard to forward links from the base station to mobile stations, the fourth signal processing unit 370 advances the fourth even-second clock by a time for which the fourth even-second clock is delayed from the first even-second clock, and then demodulates and transmits the forward traffic channel in sync with the advanced clock. In regard to reverse links from mobile stations to the base station, the fourth signal processing unit 370 detects and demodulates access and traffic channels transmitted from mobile stations located in only the fourth zone 140 in sync with the fourth even-second clock so that reverse links covering only the fourth zone 140 are established.

Each of the first, second, third, and fourth signal processing units 340, 350, 360, 370 has the configuration shown in FIG. 2 except that respective base station modem ASICs of the second, third, and fourth signal processing units 350, 360, and 370 are provided with timing compensation registers respectively performing a control for transmitting the forward traffic channel to mobile stations in a state advanced by respective times for which the second, third and fourth even-second clocks are delayed from the first even-second clock.

The RF signal processing means 400 includes an RF transmitter unit 410 for receiving forward link channel signals from the first, second, third and fourth signal processing units 340, 350, 360 and 370 to be transmitted to mobile stations and RF modulating the received forward link channel signals in the form of a signal capable of being transmitted over a transmitting antenna 500, and an RF receiver unit 420 for receiving a reverse link channel signal from a mobile station over a receiving antenna 510 or 513 and RF modulating the received reverse link channel signal in the form of a signal capable of being processed in the first, second, third, and fourth signal processing units 340, 350, 360, and 370.

A service area expanding method, which is carried out using the apparatus having the above mentioned configuration according to the second embodiment of the present invention, will now be described.

FIG. 7 is a flow chart illustrating a method for expanding a service area of a CDMA mobile communication system in accordance with the second embodiment of the present invention. In FIG. 5, "S" represents processing steps.

In accordance with the method, the clock generating unit 200 first receives 10 MHZ, TOD, and 1-PPS signals from the GPS receiver 100 and generates a first even-second clock synchronized to the 1-PPS signal. The clock generating unit 200 also generates second, third, and fourth even-second clocks delayed by respective maximum bidirectional propagation delay values associated with the second, third, and fourth zones 120, 130, and 140 with respect to the first even-second clock (S'1).

The first, second, third, and fourth even-second clocks are then applied to the first, second, third, and fourth signal processing units 340, 350, 360, and 370, respectively (S'2). In sync with the received first even-second clock, the first signal processing unit 340 then modulates pilot, synchronization, and paging channels and transmits the modulated channels over all zones in the service area via the RF signal processing means 400 and transmitting antenna 500 (S'3).

Where a mobile station in the first zone 110 transmits an access channel in response to the transmitted channels, all the first, second, third, and fourth signal processing units 340, 350, 360, and 370 receive the access channel via the receiving antenna 510 or 513 and RF signal processing unit 400 (S'4). At this time, only the first signal processing unit 340 detects and demodulates the access channel in sync with the first even-second clock (S'5).

The first processing unit 340 then modulates a traffic channel in sync with the first even-second clock and then transmits over the service area via the RF signal processing means 400 and transmitting antenna 500 (S'6). The forward traffic channel is received to the mobile station in the first zone 110. In response to the forward traffic channel, the mobile station then transmits a reverse traffic channel to the base station (S'7).

The reverse traffic channel from the mobile station is received to all signal processing units via the receiving antenna 510 or 513 and RF signal processing means 400. In sync with the first even-second clock, only the first signal processing unit 340 detects and demodulates the reverse traffic channel (S'8). The entire procedure is then completed.

On the other hand, where a mobile station in the second zone 120 transmits, following step S'3, an access channel (S'9), all the first, second, third, and fourth signal processing units 340, 350, 360, and 370 receive the access channel via the receiving antenna 510 or 513 and RF signal processing unit 400. At this time, only the second signal processing unit 350 detects and demodulates the access channel in sync with the second even-second clock (S'10).

The channel card processor in the second processing unit 350 then modulates the forward traffic channel in a state advanced by a desired delay time corresponding to a delay time for which the second even-second clock is delayed from the first even-second clock. The modulated forward traffic channel is then externally transmitted via the RF signal processing means 400 and transmitting antenna 500 (S'11). The forward traffic channel is received to the mobile station in the second zone 120. In response to the forward traffic channel, the mobile station then transmits a reverse traffic channel to the base station (S'12).

The reverse traffic channel from the mobile station is received to all signal processing units via the receiving antenna 510 or 513 and RF signal processing means 400. In sync with the second even-second clock, only the second signal processing unit 350 detects and demodulates the reverse traffic channel (S'13). The entire procedure is then completed.

Where a mobile station in the third zone 130 transmits, following step S3, an access channel (S'14), all the first, third, third, and fourth signal processing units 340, 350, 360, and 370 receive the access channel via the receiving antenna 510 or 513 and RF signal processing unit 400. At this time, only the third signal processing unit 360 detects and demodulates the access channel in sync with the third even-second clock (S'15).

The channel card processor in the third processing unit 360 then modulates the forward traffic channel in a state advanced by a desired delay time corresponding to a delay time for which the third even-second clock is delayed from the first even-second clock. The modulated forward traffic channel is then externally transmitted via the RF signal processing means 400 and transmitting antenna 500 (S'16). The forward traffic channel is received to the mobile station in the third zone 130. In response to the forward traffic channel, the mobile station then transmits a reverse traffic channel to the base station (S'17).

The reverse traffic channel from the mobile station is received to all signal processing units via the receiving antenna 510 or 513 and RF signal processing means 400. In sync with the third even-second clock, only the third signal processing unit 360 detects and demodulates the reverse traffic channel (S'18). The entire procedure is then completed.

On the other hand, where a mobile station in the fourth zone 140 transmits, following step S'3, an access channel (S'19), all the first, fourth, fourth, and fourth signal processing units 340, 350, 360, and 370 receive the access channel via the receiving antenna 510 or 513 and RF signal processing unit 400. At this time, only the fourth signal processing unit 360 detects and demodulates the access channel in sync with the fourth even-second clock (S'20).

The channel card processor in the fourth processing unit 370 then modulates the forward traffic channel in a state advanced by a desired delay time corresponding to a delay time for which the fourth even-second clock is delayed from the first even-second clock. The modulated forward traffic channel is then externally transmitted via the RF signal processing means 400 and transmitting antenna 500 (S'21). The forward traffic channel is received to the mobile station in the fourth zone 140. In response to the forward traffic channel, the mobile station then transmits a reverse traffic channel to the base station (S'22).

The reverse traffic channel from the mobile station is received to all signal processing units via the receiving antenna 510 or 513 and RF signal processing means 400. In sync with the fourth even-second clock, only the fourth signal processing unit 370 detects and demodulates the reverse traffic channel (S'23). The entire procedure is then completed.

As apparent from the above description, in accordance with the service area expanding apparatus and method according to the present invention, the service area of a CDMA mobile communication system, which is defined by a radius longer than a radius of a communication supported area, namely, a cell, restricted in terms of timing due to the hardware of a base station modem ASIC equipped in the system, is radially divided into a plurality of radial zones by a constant distance not longer than a maximum possible cell radius allowed by the base station modem ASIC. In accordance with the present invention, signal processing units are used which are configured in such a fashion that one of them covers the entire zone of the service area in regard to forward links from an associated base station to mobile stations in different zones of the service area while covering only the zone nearest to the base station in regard to reverse links from the mobile stations to the base station. The remaining signal processing units cover reverse links associated with the remaining zones of the service area, respectively. By such a configuration, it is possible to extend the radius of the cell limited in terms of timing. Accordingly, the present invention provides an economically advantageous effects as compared to conventional techniques involving installation of a plurality of additional base stations to expand a service area of a CDMA system restricted in terms of timing.

Alternatively, the signal processing units may be configured in such a fashion that in regard to forward links, one of them processes pilot, synchronization and paging channels covering the entire zone of the service area and a traffic channel covering only the zone nearest to the base station while, in regard to reverse links, processing access and traffic channels covering only the zone nearest to the base station. In this case, the remaining signal processing units process traffic channels covering the remaining zones of the service area other than the nearest zone in regard to forward links, respectively, while processing access and traffic channels covering the remaining zones in regard to reverse links. By such a configuration, there is a superior effect in that the signal processing units of the service area expanding apparatus for the CDMA mobile communication system can be more efficiently used.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for expanding a service area of a CDMA mobile communication system from a first zone resulting from a restriction of the service area occurring in terms of timing to second, third and fourth zones gradually expanding wider than the first zone by a distance not longer than a cell radius allowed by a base station modem application-specific integrated circuit (ASIC) equipped in the system, comprising:

a clock generating unit for receiving 10 MHZ, time of day (TOD), and 1-pulse per second (PPS) signals from a global positioning system (GPS) receiver and generating a first even-second clock synchronized to the 1-PPS signal, the clock generating unit also generating second, third, and fourth even-second clocks delayed by respective maximum bidirectional propagation delay values associated with the second, third and fourth zones;

a first signal processing unit for receiving the first even-second clock from the clock generating unit, the first signal processing unit serving to, in regard to forward links from an associated base station to mobile stations in the service area, modulate and transmit forward link channels covering all the first, second, third and fourth zones in sync with the first even-second clock while, in regard to reverse links from the mobile stations to the base station, detecting and demodulating only reverse link channels transmitted from mobile stations located in the first zone in sync with the first even-second clock;

a second signal processing unit for receiving the second even-second clock from the clock generating unit, the second signal processing unit serving to detect and demodulate only reverse link channels transmitted to the base station from mobile stations located in the second zone in sync with the second even-second clock;

a third signal processing unit for receiving the third even-second clock from the clock generating unit, the third signal processing unit serving to detect and demodulate only reverse link channels transmitted to the base station from mobile stations located in the third zone in sync with the third even-second clock; and a fourth signal processing unit for receiving the fourth even-second clock from the clock generating unit, the fourth signal processing unit serving to detect and demodulate only reverse link channels transmitted to the base station from mobile stations located in the fourth zone in sync with the fourth even-second clock.

2. The apparatus in accordance with claim 1, wherein each of the first, second, third and fourth signal processing units comprises:

at least one channel card including at least one channel element provided with a set of base station modem ASICs and adapted to modulate/demodulate digital signals, and a channel card processor adapted to control the channel element; and an analog modulator/demodulator unit including a D/A converter for receiving a digital signal from an associated one of the at least channel card and converting the received digital signal into an analog signal, a QPSK modulator for receiving the analog signal from the D/A converter and QPSK modulating the received analog signal, a QPSK demodulator for receiving an input radio frequency (RF) signal and QPSK demodulating the input RF signal, and an A/D converter for receiving the QPSK demodulated signal from the QPSK demodulator and converting the received signal into a digital signal.

3. The apparatus in accordance with claim 1, further comprising RF signal processing means comprising:

an RF transmitter unit coupled between the first, second, third and fourth signal processing unit and the transmitting and receiving antennas equipped in the base station, the RF transmitter unit receiving forward link channels from the first signal processing unit and RF modulating the received forward link channels in the form of a signal capable of being transmitted over the transmitting antenna; and an RF receiver unit for receiving a reverse link channel signal from a mobile station over the receiving antenna and RF modulating the received reverse link channel signal in the form of a signal capable of being processed in the first, second, third, and fourth signal processing units.

4. An apparatus for expanding a service area of a CDMA mobile communication system from a first zone resulting from a restriction of the service area occurring in terms of timing to second, third and fourth zones gradually expanding wider than the first zone by a distance not longer than a cell radius allowed by a base station modem application-specific integrated circuit (ASIC) equipped in the system, comprising:

a clock generating unit for receiving 10 MHZ, time of day (TOD), and 1-pulse per second (PPS) signals from a global positioning system (GPS) receiver and generating a first even-second clock synchronized to the 1-PPS signal, the clock generating unit also generating second, third, and fourth even-second clocks delayed by respective maximum bidirectional propagation delay values associated with the second, third and fourth zones;

a first signal processing unit for receiving the first even-second clock from the clock generating unit, the first signal processing unit serving to, in regard to forward links from an associated base station to mobile stations in the service area, modulate and transmit pilot, synchronization and paging channels covering all the first, second, third and fourth zones and a traffic channel covering the first zone in sync with the first even-second clock while, in regard to reverse links from the mobile stations to the base station, detecting and demodulating only reverse access and traffic channels transmitted from mobile stations located in the first zone in sync with the first even-second clock so as to cover only the first zone;

a second signal processing unit for receiving the second even-second clock from the clock generating unit, the second signal processing unit serving to, in regard to forward links from the base station to the mobile stations in the second zone, modulate and transmit the forward traffic channel in a state advanced by a desired delay time corresponding to a delay time for which the second even-second clock is delayed from the first even-second clock while, in regard to reverse links from the mobile stations to the base station, detecting and demodulating only reverse access and traffic channels transmitted from the mobile stations in the second zone in sync with the second even-second clock so as to cover only the second zone;

a third signal processing unit for receiving the third even-second clock from the clock generating unit, the third signal processing unit serving to, in regard to forward links from the base station to the mobile stations in the third zone, modulate and transmit the forward traffic channel in a state advanced by a desired delay time corresponding to a delay time for which the third even-second clock is delayed from the first even-second clock while, in regard to reverse links from the mobile stations to the base station, detecting and demodulating only reverse access and traffic channels transmitted from the mobile stations in the third zone in sync with the third even-second clock so as to cover only the third zone; and a fourth signal processing unit for receiving the fourth even-second clock from the clock generating unit, the fourth signal processing unit serving to, in regard to forward links from the base station to the mobile stations in the fourth zone, modulate and transmit the forward traffic channel in a state advanced by a desired delay time corresponding to a delay time for which the fourth even-second clock is delayed from the first even-second clock while, in regard to reverse links from the mobile stations to the base station, detecting and demodulating only reverse access and traffic channels transmitted from the mobile stations in the fourth zone in sync with the fourth even-second clock so as to cover only the fourth zone.

5. The apparatus in accordance with claim 4, further comprising RF signal processing means comprising:

an RF transmitter unit coupled between the first, second, third and fourth signal processing unit and the transmitting and receiving antennas equipped in the base station, the RF transmitter unit receiving forward link channels from the first signal processing unit and RF modulating the received forward link channels in the form of a signal capable of being transmitted over the transmitting antenna; and an RF receiver unit for receiving a reverse link channel signal from a mobile station over the receiving antenna and RF modulating the received reverse link channel signal in the form of a signal capable of being processed in the first, second, third, and fourth signal processing units.

6. The apparatus in accordance with claim 4, wherein:

each of the first, second, third and fourth signal processing units comprises at least one channel card including at least one channel element provided with a set of base station modem ASICs and adapted to modulate/demodulate digital signals, and a channel card processor adapted to control the channel element, and an analog modulator/demodulator unit including a D/A converter for receiving a digital signal from an associated one of the at least channel card and converting the received digital signal into an analog signal, a QPSK modulator for receiving the analog signal from the D/A converter and QPSK modulating the received analog signal, a QPSK demodulator for receiving an input radio frequency (RF) signal and QPSK demodulating the input RF signal, and an A/D converter for receiving the QPSK demodulated signal from the QPSK demodulator and converting the received signal into a digital signal; and the second, third and fourth signal processing units are provided at their base station modem ASICs with timing compensation registers respectively transmitting the forward traffic channel to mobile stations in a state advanced by desired delay times corresponding to respective times for which the second, third and fourth even-second clocks are delayed from the first even-second clock.

7. A method for expanding a service area of a CDMA mobile communication system from a first zone resulting from a restriction of the service area occurring in terms of timing to second, third and fourth zones gradually expanding wider than the first zone by a distance not longer than a cell radius allowed by a base station modem application-specific integrated circuit (ASIC) equipped in the system, comprising the steps of:

receiving, at a clock generating unit, 10 MHZ, TOD, and 1-PPS signals from the GPS receiver and generating, from the clock generating unit, a first even-second clock synchronized to the 1-PPS signal and second, third, and fourth even-second clocks delayed by respective maximum bidirectional propagation delay values associated with the second, third and fourth zones with respect to the first even-second clock;

receiving, at first, second, third, and fourth signal processing units, the first, second, third, and fourth even-second clocks while modulating and transmitting pilot, synchronization, paging, and traffic channels covering all the first, second, third and fourth zones in sync with the first even-second clock by the first signal processing unit;

detecting and demodulating an access channel transmitted from a mobile station located in the service area by one of the first, second, third, and fourth signal processing units associated with the zone where the mobile station is located, in sync with an associated one of the first, second, third, and fourth even-second clocks;

modulating and transmitting a forward traffic channel associated with the zone of the mobile station in sync with the first even-second clock by the first signal processing unit; and detecting and demodulating a reverse traffic channel transmitted from the mobile station in sync with the associated even-second clock by the associated signal processing unit.

8. A method for expanding a service area of a CDMA mobile communication system from a first zone resulting from a restriction of the service area occurring in terms of timing to second, third and fourth zones gradually expanding wider than the first zone by a distance not longer than a cell radius allowed by a base station modem application-specific integrated circuit (ASIC) equipped in the system, comprising the steps of:

receiving, at a clock generating unit, 10 MHZ, TOD, and 1-PPS signals from the GPS receiver and generating, from the clock generating unit, a first even-second clock synchronized to the 1-PPS signal and second, third, and fourth even-second clocks delayed by respective maximum bidirectional propagation delay values associated with the second, third and fourth zones with respect to the first even-second clock;

receiving, at first, second, third, and fourth signal processing units, the first, second, third, and fourth even-second clocks while modulating and transmitting pilot, synchronization, paging, and traffic channels covering all the first, second, third and fourth zones in sync with the first even-second clock by the first signal processing unit;

detecting and demodulating an access channel transmitted from a mobile station located in the service area by one of the first, second, third, and fourth signal processing units associated with the zone where the mobile station is located, in sync with an associated one of the first, second, third, and fourth even-second clocks;

modulating and transmitting a forward traffic channel in sync with the first even-second clock by the first signal processing unit when the zone of the mobile station corresponds to the first zone while modulating and transmitting, by the associated signal processing unit, the forward traffic channel in a state advanced by a desired delay time corresponding to a delay time for which the associated even-second clock is delayed from the first even-second clock when the zone of the mobile station corresponds to one of the second, third, and fourth zones; and detecting and demodulating a reverse traffic channel transmitted from the mobile station in sync with the associated even-second clock by the associated signal processing unit.

* * * * *